April 20, 1943.  H. E. HEATH  2,316,956
VALVE LOCKING DEVICE
Filed Sept. 13, 1940   2 Sheets-Sheet 1

Inventor:
Harry E. Heath
By Everett A. Johnson
Attorney.

April 20, 1943. H. E. HEATH 2,316,956
VALVE LOCKING DEVICE
Filed Sept. 13, 1940  2 Sheets-Sheet 2

Inventor
Harry E. Heath
By Everett A. Johnson
Attorney

Patented Apr. 20, 1943

2,316,956

UNITED STATES PATENT OFFICE 2,316,956

VALVE LOCKING DEVICE

Harry Eugene Heath, Tulsa, Okla., assignor to Stanolind Pipe Line Company, Tulsa, Okla., a corporation of Maine Application September 13, 1940, Serial No. 356,590

3 Claims. (Cl. 70—180)

This invention relates to locks for valves and has for an object the provision of means associated with the fixed valve casing and engageable with the valve stem or actuating shaft to prevent rotation thereof. Other objects of the invention will become apparent as the following description proceeds.

In the drawings, wherein the same reference numerals designate like or corresponding parts:

Figures 1, 2, 3:
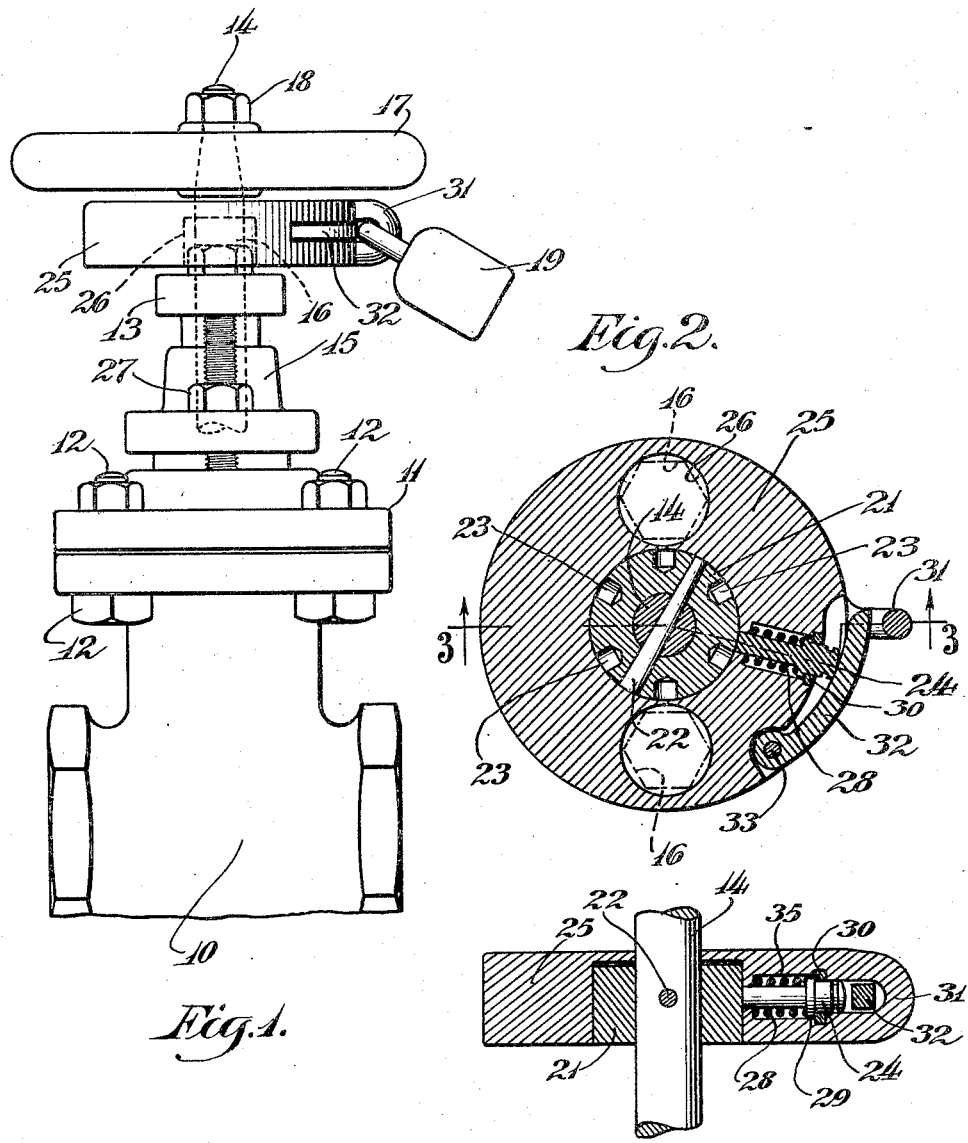
Figure 1 is a side elevation showing my invention as applied to a gate valve.
Figure 2 is a sectional view of my lock-housing.
Figure 3 is a sectional view taken on the line 3—3 of Figure 2.

Referring to Figure 1, a gate valve is shown having a casing or body 10 and a suitable bonnet 11 secured to the body of the casing 10 by bolts 12. Carried by the bonnet 11 is guide member 13 for guiding valve stem 14. A valve stem 14 of the non-rising type works through a packing gland 15 secured by stud bolts 16. The upper end of the valve stem 14 carries a hand wheel 17 secured thereto by a nut 18 which constitutes the hub of hand wheel 17. The lower end of valve stem 14 controls the valve, not shown.

With this arrangement of parts it will be apparent that the rotation of the hand wheel 17, by means of suitable threaded connection of the valve stem, causes the sealing element within the body of casing 10 to be operated to permit the flow of fluid through the valve while rotation in the other direction will cause the sealing member to assume a closed position.

Figure 4:
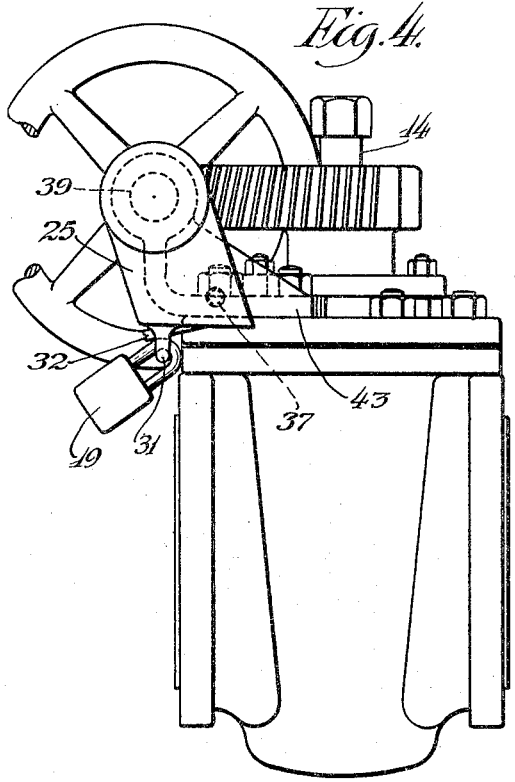
Figure 4 is a side elevation showing another modification of my invention as applied to a plug valve.
Figures 6, 7:
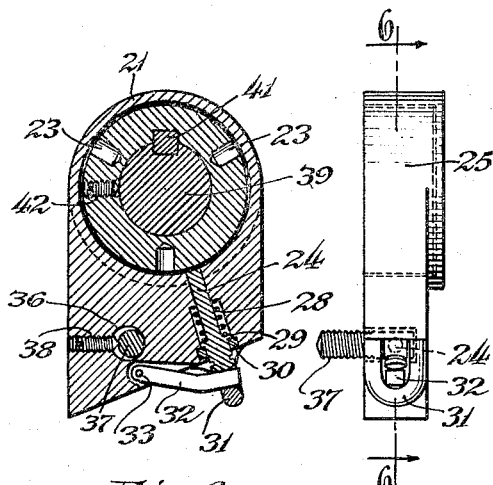
Figure 6 is a section taken along the line 6—6 in Figure 7 of the modification shown in Figures 4 and 5.
Figure 7 shows the locking assembly viewed from an end.
Figure 5:
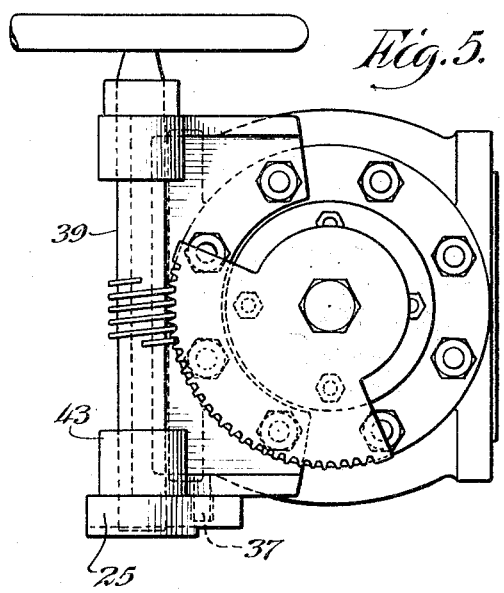
Figure 5 is a top view of the installation shown in Figure 4.
Figure 8:
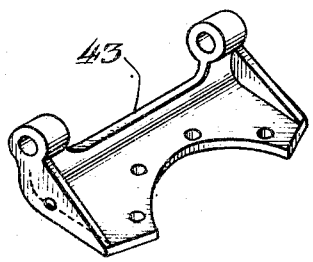
Figure 8 is a perspective view of a hand wheel shaft bracket.

When the padlock 19 is applied to the lock assembly, as described below and shown in Figures 1, 4, and 5, rotation of the valve stem 14 is impossible and tampering with the valve is prevented.

Referring in more detail to the several figures of the drawings, and more particularly to the form of my invention shown in Figures 2 and 3: Collar 21 is fixed to the valve stem 14 by suitable means as, for example, by pin 22, and is provided with a plurality of radial keyways 23 for receiving locking plunger or dog 24.

An annular lock-housing 25 surrounds the collar 21 and may comprise a disc with a countersunk bore to accommodate collar 21 and valve stem 14 as shown in Figures 2 and 3, or may be bored through to form an annular housing. Recesses 26 can be provided on the lower surface of the lock-housing 25 to receive the valve stem packing gland stud bolts 16. Thus the housing is fixed relative to the valve casing. The lockhousing is bored radially to form a recess which comprises a chamber 35 of three diameters adapted to receive the spring-loaded lock plunger 24 slidable therein, with plunger spring 28 in the intermediate section, and retainer ring 30 in the outermost section. Lock-shackle 31 or its equivalent may be provided to cooperate with lever 32 to actuate plunger 24. As shown, the lever is pivotally attached to lock-housing 25 by retainer pin 33 and lock-shackle 31 is integral with lock-housing 25.

In the operation of my locking device the lever 32 is depressed, for example, by the insertion of a padlock 19 between lock-shackle 31 and the lever 32, causing the plunger or dog 24 to enter one of the keyways 23 in collar 21. Since the lock-housing 25 is fixed against rotation by the valve stem packing gland stud bolts 16 cooperating with recesses 26, the valve cannot be operated when the padlock or its equivalent is in place. When the lock is removed plunger spring 28 urges the locking dog 24 radially outward until boss 29 strikes retainer ring 30 and then the valve stem 14 and collar 21 are free to rotate within the fixed lock-housing 25.

A modification of the invention shown in Figures 4, 5, 6, 7 and 8, wherein the locking mechanism is applied to a plug valve, is quite similar to that which has been described, the main difference in construction being in the details of the elements of the lock-housing and the means of fixing the housing relative to the rotatable shaft. Corresponding elements are designated by similar reference numerals.

A bore in collar 21 is adapted to engage the valve actuating or hand wheel shaft 39. Keyway 40 is provided in the shaft and collar so that when the key 41 and Allen set screw 42 are in place, the collar 21 is locked against rotational and longitudinal movement about and along the shaft 39. The locking dog assembly comprises elements corresponding to those in the embodiments shown in Figures 1, 2 and 3. It includes chamber 35, spring-retracted plunger 24, plunger spring 28, boss 29, retainer ring 30 and means 23 for engaging the locking means 24. Substituted for the recesses 26 of the embodiment shown in Figure 2, the lock-housing 25 of the present embodiment is provided with positive means adapted to prevent rotation of the lock assembly about the collar 21. The hand wheel shaft-bearing bracket 43 shown in Figures 5 and 8, or its equivalent, is provided with a stud bolt 37, enters a recess 36, and is held by a set screw 38 in the lock-housing to prevent rotation with the shaft. Other means may be constructed and arranged to prevent rotation of the lock-housing and it is contemplated that stud bolt 37 may be tapped into any other relatively fixed point on the valve assembly. In other respects this embodiment of my invention operates as described above in connection with the modification and installation shown in Figures 1, 2 and 3.

The foregoing detailed description sets forth my invention in preferred practical forms but inasmuch as details of the construction can be varied without departing from the spirit of the invention, the embodiments shown are to be considered by way of example only. In any event it will be understood that other constructions will occur to those skilled in the art in view of this description and that I do not mean to be limited except as defined by the claims.

I claim:

1. A lock for a valve stem comprising a relatively fixed housing having a bore of three diameters forming three chambers, a valve stem extending into said housing, a locking mechanism within said housing including a lock plunger slidable within the said bore, a boss on said plunger, a spring in the intermediate chamber engaging said boss and normally urging said lock plunger away from said valve stem, a retainer ring in the outermost chamber adapted to restrict the outward movement of the plunger, a locking lever carried by said fixed housing and engaging the outer end of said plunger for holding the plunger in its locking position, a collar fixed to said valve stem adapted to engage said locking plunger for locking the stem against rotation when said locking plunger is in the depressed position and a means adapted to retain the elements in the locking position.

2. In a device for locking a valve stem, a collar fixed about said valve stem, a relatively fixed lock-housing surrounding said collar, a locking mechanism within said housing including a slidable locking plunger, a coil spring within said housing and adapted for normally urging said locking plunger outwardly of said collar, a locking lever exterior of said housing adapted to depress said locking plunger toward said collar, said collar being adapted to engage an end of said depressed plunger whereby rotation of the stem is prohibited and removable means for retaining the locking mechanism in the locking position.

3. A lock for a valve stem comprising a relatively fixed lock-housing, said housing including means for surrounding a collar fixed to a portion of the valve stem, a chamber in said lock-housing extending radially of the longitudinal axis of the valve stem, a locking mechanism within said chamber including a slidable locking bolt, a coil spring about said bolt and within said chamber normally urging said locking bolt outwardly and radially of said valve stem, a collar fixed to said valve stem and adapted to engage the inner end of said bolt for locking the stem against rotation, a locking lever, one end of said lever being pinned to said lock-housing and the free end of said lever engaging the outer end of the locking bolt, and removable means adapted to retain the locking mechanism in a depressed position whereby the locking bolt and the collar cooperate to prevent rotation of the valve stem.

HARRY EUGENE HEATH.